(12) United States Patent
Yang

(10) Patent No.: US 11,355,124 B2
(45) Date of Patent: Jun. 7, 2022

(54) VOICE RECOGNITION METHOD AND VOICE RECOGNITION APPARATUS

(71) Applicant: BOE TECHNOLOGY GROUP CO., LTD., Beijing (CN)

(72) Inventor: Xiangdong Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 217 days.

(21) Appl. No.: 16/327,319

(22) PCT Filed: Feb. 9, 2018

(86) PCT No.: PCT/CN2018/076031
§ 371 (c)(1),
(2) Date: Feb. 21, 2019

(87) PCT Pub. No.: WO2018/233300
PCT Pub. Date: Dec. 27, 2018

(65) Prior Publication Data
US 2019/0180756 A1    Jun. 13, 2019

(30) Foreign Application Priority Data

Jun. 20, 2017   (CN) .......................... 201710466754.X

(51) Int. Cl.
*G10L 17/00* (2013.01)
*G10L 15/02* (2006.01)
(Continued)

(52) U.S. Cl.
CPC ............. *G10L 17/00* (2013.01); *G10L 15/02* (2013.01); *G10L 15/22* (2013.01); *G10L 15/07* (2013.01); *G10L 2015/227* (2013.01)

(58) Field of Classification Search
CPC ............................... G10L 17/10; G10L 17/22
See application file for complete search history.

(56) References Cited

U.S. PATENT DOCUMENTS 5,412,738 A * 5/1995 Brunelli ............. G06K 9/00885
382/115
5,897,616 A * 4/1999 Kanevsky ................ G10L 17/24
379/88.02
(Continued)

FOREIGN PATENT DOCUMENTS

| CN | 102645977 A | 8/2012 |
|---|---|---|
| CN | 102915731 A | 2/2013 |

(Continued)

OTHER PUBLICATIONS

International Search Report and English Translation of Box V of the Written Opinion dated Apr. 28, 2018, received for corresponding Chinese Application No. PCT/CN2018/076031.
(Continued)

*Primary Examiner* — Brian L Albertalli
(74) *Attorney, Agent, or Firm* — Kinney & Lange, P.A.

(57) ABSTRACT

The present disclosure provides a voice recognition method and a voice recognition apparatus. The voice recognition method includes the following operations of acquiring an identification result of an operator; acquiring an acoustic feature set corresponding to the operator based on the identification result of the operator; and recognizing voice of the operator from received sound based on the acquired acoustic feature set.

17 Claims, 3 Drawing Sheets

(51) Int. Cl.
*G10L 15/22* (2006.01)
*G10L 15/07* (2013.01)

(56) References Cited

U.S. PATENT DOCUMENTS

| | | | | |
|---|---|---|---|---|
| 7,158,871 | B1* | 1/2007 | Ilan | G01C 21/3608 |
| | | | | 701/36 |
| 8,185,392 | B1* | 5/2012 | Strope | G10L 15/07 |
| | | | | 704/252 |
| 9,336,781 | B2* | 5/2016 | Scheffer | G10L 17/14 |
| 10,178,301 | B1* | 1/2019 | Welbourne | G06K 9/00892 |
| 10,474,800 | B2* | 11/2019 | Kurian | H04L 63/0428 |
| 10,573,106 | B1* | 2/2020 | Brady | G06K 9/00771 |
| 2003/0144844 | A1* | 7/2003 | Colmenarez | G10L 15/24 |
| | | | | 704/273 |
| 2005/0021340 | A1* | 1/2005 | Steinbiss | G07C 9/37 |
| | | | | 704/273 |
| 2005/0086056 | A1* | 4/2005 | Yoda | G10L 15/24 |
| | | | | 704/246 |
| 2014/0278435 | A1* | 9/2014 | Ganong, III | G10L 15/22 |
| | | | | 704/275 |
| 2016/0086609 | A1* | 3/2016 | Yue | G10L 15/22 |
| | | | | 704/239 |
| 2016/0111084 | A1 | 4/2016 | Bang et al. | |
| 2016/0111088 | A1 | 4/2016 | Park | |
| 2016/0366528 | A1* | 12/2016 | Landqvist | H04R 27/00 |
| 2017/0011735 | A1 | 1/2017 | Kim et al. | |
| 2017/0019480 | A1 | 1/2017 | Yokota et al. | |
| 2017/0148443 | A1 | 5/2017 | Haider et al. | |

FOREIGN PATENT DOCUMENTS

| | | |
|---|---|---|
| CN | 103871409 A | 6/2014 |
| CN | 103903613 A | 7/2014 |
| CN | 104217152 A | 12/2014 |
| CN | 104881117 A | 9/2015 |
| CN | 105096940 A | 11/2015 |
| CN | 105529026 A | 4/2016 |
| CN | 105895096 A | 8/2016 |
| CN | 105957523 A | 9/2016 |
| CN | 106164398 A | 11/2016 |
| CN | 106218557 A | 12/2016 |
| CN | 106537493 A | 3/2017 |
| CN | 106682090 A | 5/2017 |
| JP | 2000080828 A | 3/2000 |

OTHER PUBLICATIONS

First Chinese Office Action dated Mar. 19, 2020, received for corresponding Chinese Application No. 201710466754.X, 17 pages.
Second Chinese Office Action dated Sep. 30, 2020, received for corresponding Chinese Application No. 201710466754.X.

* cited by examiner

VOICE RECOGNITION METHOD AND VOICE RECOGNITION APPARATUS

CROSS-REFERENCE TO RELATED APPLICATION(S)

This application claims priority to the PCT application No. PCT/CN2018/076031, filed on Feb. 9, 2018, entitled "VOICE RECOGNITION METHOD AND VOICE RECOGNITION APPARATUS", which claims priority to the Chinese Patent Application No. 201710466754.X, filed on Jun. 20, 2017, entitled "VOICE RECOGNITION METHOD AND VOICE RECOGNITION APPARATUS", which are incorporated herein by reference in their entireties.

TECHNICAL FIELD

The present disclosure relates to the field of voice recognition, and more particularly, to a voice recognition method and a voice recognition apparatus.

BACKGROUND

Voice recognition based voice recognition technology is gaining more and more applications. However, due to the presence of noise or sound from a non-controlling person, voice recognition and corresponding voice control operations for a controlling person may be affected. Therefore, the voice control technology has been considerably limited in scenarios where high requirements are raised on accuracy and security. Especially in a case where there are many people or loud noise in a small space, it is difficult to recognize a controlling person, which may result in misoperations or danger. For example, in a scenario where a vehicle is driven, since there is a relatively small space inside the vehicle, sound emitted from each position in the space may affect voice control of a vehicle-mounted system, which may seriously affect driving safety.

SUMMARY

According to one aspect of the present disclosure, there is provided a voice recognition method. The voice recognition method includes: acquiring an identification result of the operator; acquiring an acoustic feature set corresponding to the operator based on the identification result of the operator; and recognizing voice of the operator from received sound based on the acquired acoustic feature set.

In one embodiment, before the step of acquiring an identification result of the operator, the voice recognition method further includes: judging an environmental state. The step of acquiring an identification result of the operator further includes: acquiring the identification result of the operator according to the environmental state.

In one embodiment, the step of judging an environmental state includes: receiving sensor data from at least one environmental sensor; determining whether an identification function is to be activated according to the sensor data; and returning an environmental state indicating whether the identification function is to be activated according to a determination result.

In one embodiment, the voice recognition method further includes: issuing an identification reminder when there is no identification result acquired within a preset time period.

In one embodiment, the voice recognition method further includes: creating an identity for the operator and establishing a corresponding acoustic feature set for the operator.

In one embodiment, establishing a corresponding acoustic feature set for the operator includes: receiving voice of the operator; extracting acoustic features of the operator from the received voice; and establishing an acoustic feature set corresponding to the operator according to the extracted acoustic features.

In one embodiment, establishing a corresponding acoustic feature set for the operator includes: receiving voice of the operator; transmitting the received voice to a server; and receiving an acoustic feature set corresponding to the operator from the server.

In one embodiment, the step of recognizing voice of the operator from received sound further includes: extracting acoustic features from the received sound; matching the extracted acoustic features with the acquired acoustic feature set corresponding to the operator; and recognizing the received sound as the voice of the operator if the extracted acoustic features match the acquired acoustic feature set.

In one embodiment, the step of matching the extracted acoustic features with the acquired acoustic feature set corresponding to the operator includes: calculating a maximum likelihood probability of the extracted acoustic features based on the acquired acoustic feature set corresponding to the operator; and determining that the extracted acoustic features match the acoustic feature set of the operator when the calculated probability is greater than a first threshold.

In one embodiment, the voice recognition method further includes: updating the acoustic feature set of the operator with the extracted acoustic features when the calculated probability is greater than the first threshold and less than a second threshold.

In one embodiment, the voice recognition method further includes: recognizing an operation to be performed from the voice of the operator.

According to another aspect of the present disclosure, there is further proposed a voice recognition apparatus. The voice recognition apparatus includes: a processor; a memory having instructions stored thereon, which when executed by the processor, cause the processor to: acquire an identification result of the operator; acquire an acoustic feature set corresponding to the operator based on the identification result of the operator; and recognize voice of the operator from received sound based on the acquired acoustic feature set.

In one embodiment, the instructions, which when executed by the processor, further cause the processor to: judge an environmental state; and perform an operation of acquiring the identification result of the operator according to the environmental state.

In one embodiment, the instructions, which when executed by the processor, further cause the processor to: receive sensor data from at least one environmental sensor; determine whether an identification function is to be activated according to the sensor data; and return an environmental state indicating whether the identification function is to be activated according to a determination result.

In one embodiment, the instructions, which when executed by the processor, further cause the processor to: issue an identification reminder when there is no identification result acquired within a preset time period.

In one embodiment, the instructions, which when executed by the processor, further cause the processor to: create an identity for the operator and establish a corresponding acoustic feature set for the operator.

In one embodiment, the instructions, which when executed by the processor, further cause the processor to:

receive voice of the operator; extract acoustic features of the operator from the received voice; and establish an acoustic feature set corresponding to the operator according to the extracted acoustic features.

In one embodiment, the instructions, which when executed by the processor, further cause the processor to: receive voice of the operator; transmit the received voice to a server; and receive an acoustic feature set corresponding to the operator from the server.

In one embodiment, the instructions, which when executed by the processor, further cause the processor to: extract acoustic features from the received sound; match the extracted acoustic features with the acquired acoustic feature set corresponding to the operator; and recognize the received sound as the voice of the operator if the extracted acoustic features match the acquired acoustic feature set.

In one embodiment, the instructions, which when executed by the processor, further cause the processor to: calculate a maximum likelihood probability of the extracted acoustic features based on the acquired acoustic feature set corresponding to the operator; and determine that the extracted acoustic features match the acoustic feature set of the operator when the calculated probability is greater than a first threshold.

In one embodiment, the instructions, which when executed by the processor, further cause the processor to: update the acoustic feature set of the operator with the extracted acoustic features when the calculated probability is greater than the first threshold and less than a second threshold.

In one embodiment, the instructions, which when executed by the processor, further cause the processor to: recognize an operation to be performed from the voice of the operator.

BRIEF DESCRIPTION OF THE DRAWINGS

In order to more clearly illustrate the technical solutions according to the embodiments of the present disclosure, the accompanying drawings required to be used in the description of the embodiments will be briefly described below. It is obvious that the accompanying drawings in the following description are merely some embodiments of the present disclosure, and other accompanying drawings may further be obtained by those of ordinary skill in the art according to these accompanying drawings without any creative work. In the accompanying drawings.

DETAILED DESCRIPTION

Figure 1A:
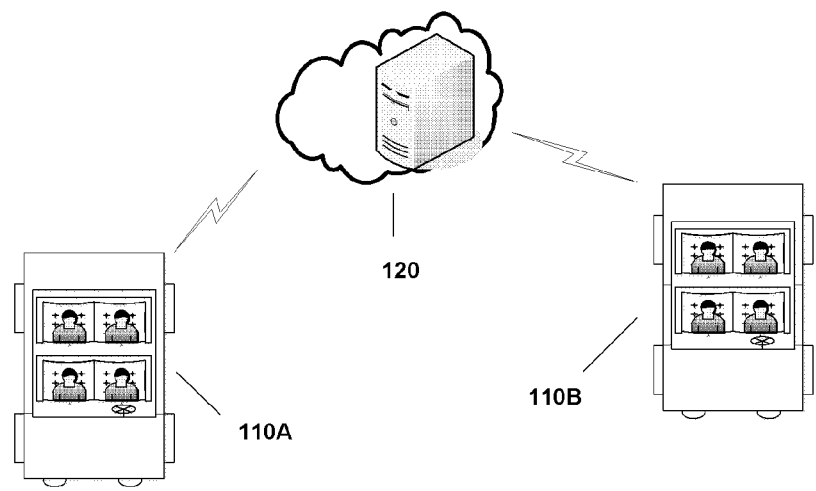
FIG. 1A illustrates network architecture of a vehicle voice control network according to an embodiment of the present disclosure.

Specific embodiments of the present disclosure will be described in detail below. It should be illustrated that the embodiments described here are illustrated merely by way of example instead of limiting the present disclosure. In the following description, numerous specific details are set forth to provide a more thorough understanding of the present disclosure. However, it will be obvious to those skilled in the art that the present disclosure may be practiced without these specific details. In other instances, well-known circuits, materials or methods are not described in detail in order to avoid obscuring the present disclosure.

Reference throughout this specification to "an embodiment", "an embodiment", "one example" or "an example" means that a particular feature, structure, or characteristic described in connection with the embodiment or example is included in at least an embodiment of the present disclosure. Thus, the appearances of the phrase "in an embodiment", "in an embodiment", "one example" or "an example" in various places throughout this specification are not necessarily all referring to the same embodiment or example. Furthermore, the particular features, structures, or characteristics may be combined in any suitable combination and/or sub-combination in one or more embodiments or examples. In addition, it should be understand by those skilled in the art that the accompanying drawings provided herein are for the purpose of illustration, and are not necessarily drawn to scale. A term "and/or" used herein comprises any or all combinations of one or more listed related items.

It should be understood that the voice recognition apparatus and the voice recognition method according to the present disclosure may be applied to various scenarios in which voice recognition may be performed, for example, scenarios in which home appliance control, industrial machine operations, vehicle driving, etc. may be performed, which is not limited here in the present disclosure. The voice recognition apparatus and the voice recognition method according to the present disclosure are particularly suitable for an application scenario in which a specific operator is required to operate on a target device. In this case, the voice recognition apparatus and the voice recognition method according to the present disclosure are applied to the target device, which can increase the accuracy of the operator's operation on the target device and improve the security of the target device.

In the following detailed description of the present disclosure, for convenience of understanding, the embodiments of the present disclosure will be described by taking a vehicle driving scenario as an example. However, it should be understood that the technical solutions according to the present disclosure are equally applicable to other scenarios mentioned above.

Firstly, a vehicle driving scenario which may be used to implement the voice recognition apparatus and the voice recognition method according to the present disclosure will be described with reference to FIGS. 1A and 1B.

Figure 1B:
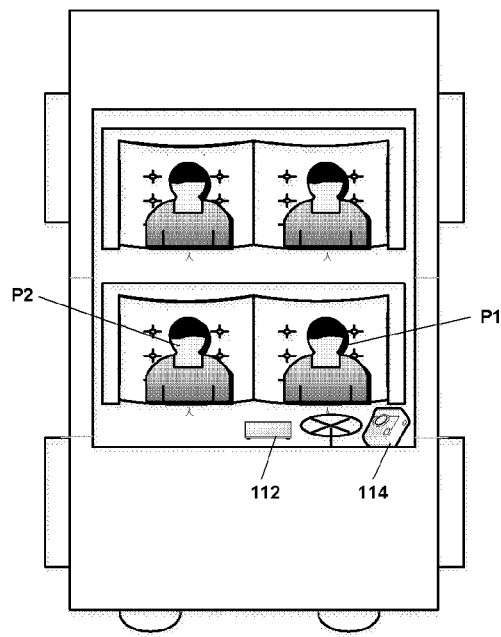
FIG. 1B illustrates an in-vehicle voice control scenario for a vehicle in the network architecture according to an embodiment of the present disclosure.

FIG. 1A illustrates network architecture of a vehicle voice control network 100, and FIG. 1B illustrates an in-vehicle voice control scenario for a single vehicle 110A in the network architecture.

In FIG. 1A, the vehicle voice control network 100 comprises vehicles 110A and 110B and a cloud server 120. The vehicles 110A and 110B communicate with the cloud server 120 via wireless communication, respectively. It should be understood that although only two vehicles 110A and 110B are shown in FIG. 1A, in other embodiments, the network 100 may comprise more or fewer vehicles, which is not limited here in the present disclosure.

The cloud server 120 may be a local or remote server implemented by any server configuration, and is capable of performing processing such as transceiving, computing, storing, training, etc. of data from the vehicles. The wireless communication between the cloud server 120 and the vehicles may be implemented in various manners, for example, through cellular communication (such as 2G, 3G, 4G or 5G mobile communication technology), WiFi, satellite communication, etc. Although direct communication between the cloud server 120 and the vehicles 110A and 110B is shown in FIG. 1A, it should be understood that, in other embodiments of the present disclosure, there may be indirect communication therebetween.

As described above, the vehicles 110A and 110B communicate with the cloud server 120 through wireless communication to implement voice control of the vehicles or vehicle-mounted systems through data obtained from the cloud server 120. Specifically, an in-vehicle voice control scenario of the vehicle 110A is shown as an example in FIG. 1B.

In FIG. 1B, a voice recognition apparatus 112 is disposed in the vehicle 110A, and an identification apparatus 114 is also exemplarily disposed in the vehicle 110A. In other embodiments, the identification apparatus 114 may be implemented as a part of the voice recognition apparatus 112, for example, as an identification unit integrated in the voice recognition apparatus 112.

The voice recognition apparatus 112 is capable of collecting and processing sound and controlling the vehicle to operate based on a processing result. In one embodiment, the voice recognition apparatus 112 comprises a sound input unit and a processor. The sound input unit may be, for example, a microphone configured to receive sound from the outside and convert the sound into an electrical signal. The processor is configured to process the generated electrical signal and instruct the vehicle to operate according to a processing result. However, in some embodiments, the voice recognition apparatus 112 may not comprise a sound input unit, and instead may receive a desired sound related signal from an external electronic device (for example, an external dedicated microphone or a sound collection device disposed in the vehicle to be separate from the voice recognition apparatus 112.)

In one embodiment, the voice recognition apparatus 112 may further comprise a database. Data related to an identity and voice of a driver may be stored in the database. For example, the database may comprise data required for the processor to process the sound signal, for example, parameters of an acoustic model, an acoustic feature set, etc. As another example, the database may comprise data related to the identity of the driver, for example, an Identity (ID) of the driver, preference data of the driver, facial features of the driver, etc.

The identification apparatus 114 is configured to identify the driver. Although the identification apparatus 114 is illustrated in FIG. 1B as a camera (or webcam) for facial recognition, it should be understood that, in other embodiments of the present disclosure, the identification apparatus 114 may be implemented as other devices, for example, a fingerprint reader, an iris scanner, a keyboard etc. for the purpose of, for example, iris recognition, fingerprint recognition, password recognition, login information recognition etc.

In one embodiment, various sensors, for example, a vehicle door sensor, a driving position sensor, a driving state sensor, etc., may also be disposed in the vehicle 110A for sensing whether the driver is approaching the vehicle or has entered the vehicle. In one embodiment, the voice recognition apparatus 112 and/or the identification apparatus 114 are activated only when it is sensed through the sensors that the driver is approaching the vehicle or has entered the vehicle, so as to reduce power consumption. In another embodiment, vehicle running information may also be obtained from a system bus of the vehicle and it is judged whether the voice recognition apparatus 112 and/or the identification apparatus 114 are activated according to the vehicle running information.

Specifically, among various sensors, the driving position sensor may utilize pedestrian tracking technology. The driving position sensor may be a webcam which is mounted on a rear view mirror and is configured to acquire an image at a driving position. Human figure features at the driving position on the image are recognized by a human figure classifier in the pedestrian tracking technology.

The driving state sensor may be a switch-type Hall sensor which is mounted on an axle of the vehicle and is configured to detect a speed of the vehicle. For example, a piece of magnetic steel may be adhered to an edge of a disc of a non-magnetic material belonging to a wheel of the vehicle, and the Hall sensor is placed near the edge of the disc. Once the disc is rotated one revolution, the Hall sensor outputs a pulse, so that a number of revolutions may be measured. When a speed of the vehicle greater than 0 is sensed, it may be judged that the vehicle is in a running state; and when a speed of the vehicle equal to 0 is sensed, it is judged that the vehicle is in a stopped state.

The vehicle door sensor may be a Hall sensor which is mounted on a door of the vehicle and is configured to judge whether the door of the vehicle is opened or closed according to a contact state with a magnet on a frame of the door. For example, when the magnet is close to the Hall sensor, a specific level may be output, and in this case, it may be judged that the door of the vehicle is closed; otherwise, it may be judged that the door of the vehicle is opened.

FIG. 1B also schematically illustrates a driver P1 located at the driving position and a passenger P2 located at a co-pilot position.

Figure 2:
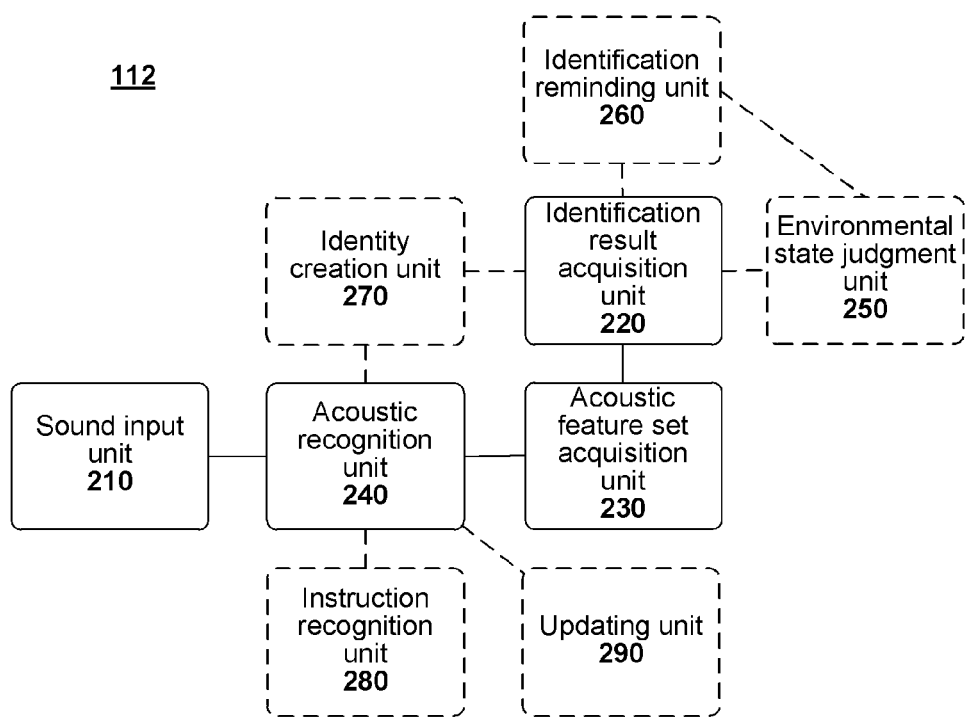
FIG. 2 illustrates a structural block diagram of a voice recognition apparatus according to an embodiment of the present disclosure.

It should be understood that the voice recognition apparatus 112 shown in FIG. 1B may be implemented not only in a form of a sound input unit and a single processor, but also in a form of a plurality of processing modules. For example, FIG. 2 illustrates a structural block diagram of the voice recognition apparatus 112 according to an embodiment of the present disclosure. As shown in FIG. 2, the voice recognition apparatus 112 may comprise a sound input unit 210, an identification result acquisition unit 220, an acoustic feature set acquisition unit 230, an acoustic recognition unit 240, an environmental state judgment unit 250, an identification reminding unit 260, an identity creation unit 270, an instruction recognition unit 280, and an updating unit 290. Here, the environmental state judgment unit 250, the identification reminding unit 260, the identity creation unit 270, the instruction recognition unit 280, and the updating unit 290 are illustrated by dashed boxes, and are not necessary in the embodiment of the present disclosure. In other embodiments, one or more of the units may be omitted or combined, or other processing modules may be added depending on the processing performed.

Specifically, the sound input unit 210 may be, for example, a microphone configured to receive sound from the outside and convert the sound into an electrical signal. The identification result acquisition unit 220 may be configured to acquire an identification result of an operator (i.e., the driver P1 in the scenario shown in FIG. 1B.) The acoustic feature set acquisition unit 230 is configured to acquire an acoustic feature set corresponding to the operator based on the identification result of the operator. The acoustic recognition unit 240 is configured to recognize voice of the operator from the received sound based on the acquired acoustic feature set. The environmental state judgment unit 250 is configured to judge an environmental state. The identification reminding unit 260 is configured to issue an identification reminder when the identification result is not obtained within a preset time period. The identity creation unit 270 is configured to create an identity for the operator and establish a corresponding acoustic feature set for the operator. The instruction recognition unit 280 is configured to recognize an operation to be performed from the voice of the operator. The updating unit 290 is configured to update the acoustic feature set of the operator with extracted acoustic features when a calculated probability is greater than a first threshold and less than a second threshold.

Further, as a hardware implementation of the voice recognition apparatus 112, in some embodiments, the voice recognition apparatus 112 may comprise, for example, a processor and a memory. For example, in a hardware arrangement 400 as described below in conjunction with FIG. 4, the voice recognition apparatus 112 may comprise a processor 406 and a memory (or more generally, a readable storage medium) 408. The memory may have instructions (for example, a computer program 410) stored thereon, which when executed by the processor, cause the processor to perform the method steps described below in connection with FIG. 3. In addition, the instructions, when executed by the processor, may also cause the processor to become various functional units 210-290 as described above. For example, in a case where the voice recognition apparatus 112 comprises hardware (for example, a microphone) for sound input, the sound input unit 210 may be the hardware itself; and in a case where the voice recognition apparatus 112 does not comprise hardware for sound input, the sound input unit 210 may be a processor-implemented functional unit configured to receive a signal related to sound input from external hardware.

Figure 3:
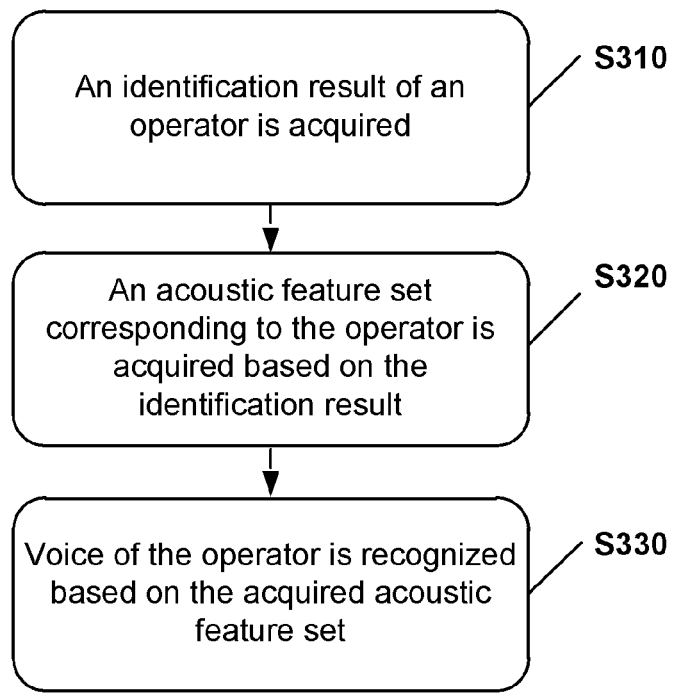
FIG. 3 illustrates a flowchart of a voice recognition method according to an embodiment of the present disclosure.

FIG. 3 illustrates a flowchart of a voice recognition method 300 which may be used in conjunction with the voice recognition apparatus 112 illustrated in FIG. 2 according to an embodiment of the present disclosure.

As shown in FIG. 3, the method 300 starts at step S310, in which an identification result of an operator is acquired. Then, in step S320, an acoustic feature set corresponding to the operator is acquired based on the identification result of the operator. Next, in step S330, voice of the operator is recognized from received sound based on the acquired acoustic feature set.

Embodiments of the present disclosure will be described in detail below in conjunction with FIGS. 2 and 3.

Firstly, in step S310, an identification result of an operator is acquired.

In one embodiment, the identification may be implemented by, for example, the external identification apparatus 114 shown in FIG. 1B. For example, the identification result acquisition unit 220 in the voice recognition apparatus 112 may acquire an identification result from the identification apparatus 114. In this case, step S310 may only simply comprise performing an operation of receiving the identification result from, for example, the identification apparatus 114.

In another embodiment, the operator is identified by the identification result acquisition unit 220 itself in the voice recognition apparatus 112. In this case, in step S310, the acquisition step is equivalent to an identification step.

As described above, identification may be implemented by means of facial recognition, iris recognition, fingerprint recognition, password recognition, login information recognition etc.

In one embodiment, before step S310, the voice recognition method 300 may further comprise a step of judging an environmental state. Further, in step S310, it is determined whether the identification result is to be acquired according to the environmental state. For example, the operation in step S310 may be performed only when the environmental state satisfies a predetermined condition (for example, a condition in which a person is approaching, a pressure is sensed through a driving position sensor etc.)

For example, in the voice recognition apparatus 112 of FIG. 2, step S310 may be performed by the environmental state judgment unit 250. Specifically, the environmental state (by taking the scenarios shown in FIGS. 1A and 1B as an example) may be judged through information from one or a combination of a vehicle door sensor, a driving position sensor, a driving state sensor, and a system bus of a vehicle. For example, in a case where an owner of the vehicle comes near the vehicle, opens a door of the vehicle, or starts the vehicle, an identification function (hardware and/or software module) may be activated according to information detected by a sensor mounted on the vehicle. More specifically, when the owner of the vehicle comes near the vehicle for the first time, the identification function (hardware and/or software module) may be activated through communication between, for example, a Bluetooth transceiver and/or an RFID reader etc. mounted on the vehicle and a Bluetooth/RFID module etc. on a key of the owner of the vehicle. As another example, when the owner of the vehicle opens the door of the vehicle, a vehicle door opening state and/or a vehicle key insertion state and/or a vehicle door opening instruction may be detected by a vehicle door sensor, a Bluetooth transceiver, and/or an RFID reader mounted on the vehicle, etc., so as to activate the identification function (hardware and/or software module.) As yet another example, when the owner of the vehicle sits at a driving position and starts the vehicle through key insertion, fingerprint, or sound, corresponding information may also be detected by a corresponding sensor (Bluetooth, RFID, a driving position sensor, a fingerprint sensor, a microphone, etc.) to activate the identification function (hardware and/or software module.) As described above, by judging the environmental state, it is possible to activate the step of acquiring the identification result only when the driver (i.e., the operator) is approaching the vehicle or has entered the vehicle (in this case, the vehicle door sensor, the driving position sensor, the driving state sensor, and the system bus of the vehicle have specific states or values), so that power consumption can be effectively reduced.

In one embodiment, in a case where it is determined according to the environmental state that the identification result is to be acquired, if there is no identification result acquired within a preset time period (for example, a time period of a certain length (for example, 10 seconds) or a time period before the vehicle is started), an identification reminder may be transmitted to the operator. The reminder may be, for example, an alarm, a flash of light, a vibration, etc. In the voice recognition apparatus 112 shown in FIG. 2, this operation may be performed by the identification reminding unit 260.

For example, by taking facial recognition as an example, if the vehicle is in a stopped state, the door of the vehicle is closed, and/or it has been tracked that there is a person at the driving position, it may be determined by the voice recognition apparatus 112 that identification should be performed. In this case, the identification apparatus 114 should start attempting to extract facial features of the driver. If there is no facial feature of the driver detected within a predetermined time period, that is, the voice recognition apparatus 112 has not been able to acquire the identification result, a voice reminder may be provided to the driver and the detection continues until the facial features of the driver are acquired.

Next, in step S320, an acoustic feature set corresponding to the operator may be acquired based on the identification result of the operator. In the voice recognition apparatus 112 shown in FIG. 2, step S320 may be performed by the acoustic feature set acquisition unit 230.

The acoustic feature set refers to a set of acoustic features. The acoustic features are important concepts in the field of voice recognition. A brief description of the relevant content will be provided below.

In the field of voice recognition, for a specific voice input sequence O={o1, o2, . . . , on} (wherein o1-ot are specific voice units, such as frames, states), it needs to recognize the voice input sequence as a specific character sequence W={w1, w2, . . . , wn}. Therefore, in this case, O is an actual observation result, and W is an actual character sequence corresponding to the result. This process is generally expressed by a probability, that is, voice recognition is actually realized by solving the following problem:

$$\hat{W} = \underset{W \in L}{\operatorname{argmax}} P(W \mid O)$$

where P(W|O) represents a conditional probability that W (i.e., the corresponding actual character sequence) occurs in a case where the event O (i.e., the actual observation result) occurs. Therefore, the above formula means that $\hat{W}$ is W in L which makes the conditional probability function P(W|O) maximal, wherein L is a full range of possible values of W.

The following formula is obtained by the Bayesian formula:

$$\hat{W} = \underset{W \in L}{\operatorname{argmax}} \frac{P(O \mid W)P(W)}{P(O)}$$

Since the above formula is calculated for a single sentence, and P(O) is invariable for a single sentence, the above formula may be rewritten as:

$$\hat{W} = \underset{W \in L}{\operatorname{argmax}} P(O \mid W)P(W)$$

where the P (O|W) part is called a maximum likelihood probability, which may be calculated through an acoustic model; and the P(W) part is called a prior probability, which may be calculated through a language model. The present embodiment is mainly related to the P(O|W) part, that is, the present embodiment is mainly related to the acoustic model.

Specifically, the acoustic model is related to how to calculate a degree to which a phoneme matches a voice signal. Therefore, there is a need to find a suitable method for representing a voice signal. Generally, the voice signal is divided into voice units, for example, a plurality of frames. For each frame, it is converted into one acoustic feature through the acoustic model used (wherein a series of operations such as Fourier transform etc. are used.) Examples of the acoustic features comprise linear prediction coefficients, cepstral coefficients, Mel frequency cepstral coefficients, perceptual linear prediction coefficients, etc.

Through the accumulation of voice materials, a large number of acoustic features may be extracted therefrom, and a correspondence between these acoustic features and phonemes may be obtained. These acoustic features having the correspondence with the phonemes constitute an acoustic feature set. From another perspective, classifiers from the acoustic features to the phonemes may be trained using the acoustic feature set, and these classifiers may be used to determine the maximum likelihood probability P(O|W). Commonly used classifiers comprise a Gaussian Mixture Model (GMM) and a Deep Neural Network (DNN) model. For example, the principle of the GMM is to estimate a distribution of acoustic features of each phoneme, and then, in a recognition phase, calculate a probability that acoustic features of each frame are generated by corresponding phonemes, and multiply probabilities of various frames to obtain P(O|W).

It should be pointed out that in the field of voice recognition, the Hidden Markov Model (HMM) and Dynamic Time Planning Model (DTW) are often used to solve a variable length problem of the acoustic feature sequence, and then obtain various available acoustic models, such as a GMM-HMM model or a Context-Dependent (CD)-DNN-HMM model, in combination with the models which are used during the creation of the classifiers.

When there are a sufficient number of acoustic features accumulated in the acoustic feature set, it may be considered that a relatively complete acoustic feature set is obtained, that is, the acoustic feature set may cover acoustic features of almost all voice units emitted by a user. The more complete the acoustic feature set, the more accurate the result of the voice recognition.

In fact, in some simple or specific scenarios, it is not necessary to recognize various voice signals, and instead it only needs to recognize a few specific voice commands. In this case, the completeness of the acoustic feature set has little effect on the technical solution. Voice recognition may be performed accurately as long as acoustic features corresponding to certain specific phonemes are accumulated during training or generation of the acoustic feature set. For example, in a driving scenario, it only needs to perform training using sentences commonly used during driving, to obtain an acoustic feature set which meets specific requirements.

In general, voice materials which are used during the generation and training of the acoustic feature set are not limited. This acoustic feature set is an acoustic feature set in the general sense, and does not have the ability to distinguish users from each other. However, in step S320 of the present embodiment, after an identity of the operator is determined, the acquired acoustic feature set is an acoustic feature set corresponding to the operator, which is created by using voice emitted by the operator as voice materials (see a process of creating the acoustic feature set corresponding to the operator hereinafter), and has the ability to distinguish users from each other. For example, referring to the scenario in FIG. 1B, after it is detected that the driver is P1, an acoustic feature set corresponding to P1 is acquired based on an identity of P1.

In one embodiment, the acoustic feature set is obtained from a cloud server (for example, the cloud server 120 in FIG. 1A.) In another embodiment, the acoustic feature set is obtained from a local memory, for example, the database described above.

It should also be pointed out here that the term "acoustic features" does not limit a length or a number thereof. In the various embodiments described above, the "acoustic features" may refer to one or more acoustic features, or may also represent one acoustic feature set.

It should be understood that a mode selection step may be additionally provided before steps S310-S320. In the mode selection step, a mode of the voice recognition apparatus 112 may be selected, wherein the mode may be, for example, a manual mode or an automatic mode. In some embodiments, once the manual mode is selected, the operations in steps S310-S320 are not performed, and instead the operator may be directly assigned a general non-specific acoustic feature set. Once the automatic mode is selected, steps S310-S320 are performed, and subsequent operations may be performed based on the acoustic feature set corresponding to the operator which is determined in step S320.

Next, in step S330, voice of the operator is recognized from received sound based on the acquired acoustic feature set. In the voice recognition apparatus 112 shown in FIG. 2, step S330 is performed by the acoustic recognition unit 240.

In one embodiment, step S330 specifically comprises the following operations.

Firstly, acoustic features are extracted from the received sound.

This process of extracting acoustic features may be performed using an acoustic model which is used when the acoustic feature set is established for the operator.

Then, the extracted acoustic features are matched with the acquired acoustic feature set corresponding to the operator.

Specifically, in this matching process, a maximum likelihood probability of the extracted acoustic features is firstly calculated based on the acquired acoustic feature set corresponding to the operator, and then it is judged whether the calculated probability is greater than a first threshold (for example, but not limited to, 80%), and when the calculated probability is greater than the first threshold, it may be determined that the extracted acoustic features match the acoustic feature set of the operator. The first threshold used here may be a probability threshold indicating that a speaker of the detected voice is actually a corresponding operator of the acoustic feature set. When the calculated probability is greater than the first threshold, it may be considered that the speaker is very likely to be the operator; otherwise, it may be considered that the speaker is less likely to be the operator or may be someone else. A value of the first threshold may be set empirically, experimentally, or in various ways and may be adjusted dynamically. A deterministic judgment criterion for determining whether the speaker is the operator may be given by using the set first threshold. The principle of this step is that, in a case where the acoustic feature set used is determined, a maximum likelihood probability calculated for voice of the operator for which the acoustic feature set is established is higher than a maximum likelihood probability calculated for voice of other people (or noise). Thus, it is possible to distinguish the voice of the operator from other sound by setting a specific first threshold.

Finally, if it is determined that the extracted acoustic features match the acquired acoustic feature set corresponding to the operator, the received sound may be recognized as the voice of the operator.

In one embodiment, there may be a case where although identification features are detected, the identity of the operator cannot be determined according to the detected identification features, for example, there may be a case where there is no identity record of the operator. In this case, the voice recognition method 300 may further comprise the following steps of creating an identity for the operator and establishing a corresponding acoustic feature set for the operator. In the voice recognition apparatus 112 shown in FIG. 2, this operation may be performed by the identity creation unit 270.

In one embodiment, the step of establishing a corresponding acoustic feature set for the operator may comprise: receiving voice of the operator; extracting acoustic features of the operator from the received voice; and establishing an acoustic feature set corresponding to the operator according to the extracted acoustic features. This embodiment corresponds to a case where the identity and the acoustic feature set are created locally at the voice recognition apparatus 112.

In another embodiment, the step of establishing a corresponding acoustic feature set for the operator may comprise: receiving the voice of the operator; transmitting the received voice to a server; and receiving an acoustic feature set corresponding to the operator from the server. This embodiment corresponds to a case where the identity and the acoustic feature set are created on the server. Here, the server may be, for example, the cloud server 120 shown in FIG. 1A.

In the present disclosure, in the process of creating the acoustic feature set corresponding to the operator, voice materials used are voice emitted by the operator himself/herself. In this way, voice recognition may be performed using the acoustic feature set specifically established for the operator particularly when the operator performs operations, by means of identification of the operator, so that the influence of noise and voice of other people on a result of the voice recognition can be better eliminated.

In one embodiment, in order to avoid a limited system storage space caused by a large number of files of an identification feature model and an acoustic model deployed locally or on the server due to large mobility of operators, the system allows N unique operator IDs and N1 normal operator IDs to be set, depending on the system storage space. Priorities of the N1 normal operator IDs in the system may be determined according to weights of time and numbers of times the target device is operated. During a statistical period, if a certain operator ID is always in a non-operational state, its priority may be reduced, that is, the operator ID may be given priority to be erased. In some other embodiments, if desired, an operator ID with a low priority and its data may also be selected to be manually cleaned.

In one embodiment, the acoustic feature set of the operator may be automatically updated with the acoustic features which are extracted each time the voice of the operator is received. In another embodiment, the updating operation may be done manually. In the voice recognition apparatus 112 shown in FIG. 2, this operation may be performed by the updating unit 290.

Of course, an update condition may also be set, for example, in one embodiment, only when the calculated maximum likelihood probability is greater than the first threshold and less than a second threshold (for example, but not limited to, 90%), the acoustic feature set of the operator is updated with the extracted acoustic features. The second threshold used here may be a threshold indicating that the acoustic feature set needs to be updated. By setting a second threshold greater than the first threshold, it is possible to ensure, to the greatest extent, that only the operator himself/ herself may update the acoustic feature set of the operator, thereby avoiding tampering with the acoustic feature set.

In another embodiment, a time length parameter is additionally set, wherein only when a maximum likelihood probability calculated during a time period equal to the time length parameter is greater than the first threshold and less than the second threshold, the acoustic feature set of the operator is updated with the extracted acoustic features.

In one embodiment, after the voice of the operator is recognized in step S330, the target device may be directly caused to execute a corresponding instruction according to a preset setting. In this case, there is no need to further perform language recognition (i.e., the process from phonemes to characters.)

In another embodiment, after step S330, the voice recognition method 300 may further comprise: recognizing an operation to be performed from the voice of the operator. In the voice recognition apparatus 112 shown in FIG. 2, this operation may be performed by the instruction recognition unit 280.

In the above step S330, according to the description of the acoustic model, the phonemes (sequence) corresponding to the voice may also be determined while the voice of the operator is recognized. Thereby, characters corresponding to the determined phonemes may further be estimated according to the language model, and the operation to be performed by the target device is determined according to content of the characters.

Further, the "operator" referred to herein is not limited to a human operator, but may be any operator, for example, an electronic device (for example, an unmanned device/program, etc.) or any possible device which may operate the vehicle.

Figure 4:
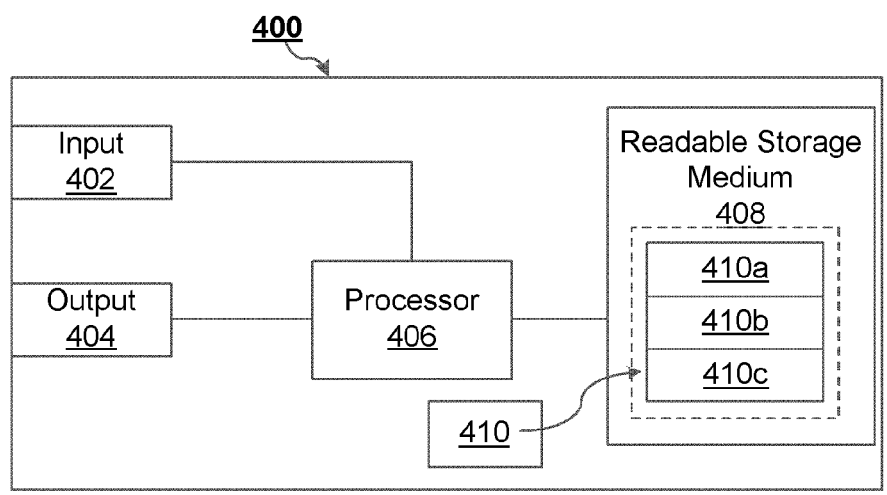
FIG. 4 illustrates a hardware arrangement diagram of a voice recognition apparatus according to an embodiment of the present disclosure.

FIG. 4 is a block diagram illustrating an exemplary hardware arrangement 400 of a voice recognition apparatus according to an embodiment of the present disclosure. The hardware arrangement 400 comprises a processor 406 (for example, a Digital Signal Processor (DSP).) The processor 406 may be a single processing unit or a plurality of processing units for performing different acts of the flows described herein. The arrangement 400 may further comprise an input unit 402 configured to receive signals from other entities, and an output unit 404 configured to provide signals to other entities. The input unit 402 and the output unit 404 may be arranged as a single entity or as separate entities. For example, in some embodiments, the input unit 402 may be the sound input unit 210 shown in FIG. 2, and more specifically, may be, for example, a microphone or an interface to a microphone. Further, the input unit 402 may also be, for example, the identification result acquisition unit 220 which may receive an identification result from the identification apparatus 114. The present disclosure is not limited thereto.

Further, the arrangement 400 may comprise at least one readable storage medium 408 in a form of a non-volatile or volatile memory, such as an Electrically Erasable Programmable Read Only Memory (EEPROM), a flash memory, and/or a hard driver. The readable storage medium 408 comprises a computer program 410 which comprises codes/computer readable instructions that, when executed by the processor 406 in the arrangement 400, enable the hardware arrangement 400 and/or the voice recognition apparatus 112 having the hardware arrangement 400 to perform, for example, the flows described above in connection with FIG. 3 and any variations thereof.

The computer program 410 may be configured as computer program codes having architecture of computer program modules 410A-410C. Therefore, in an exemplary embodiment when, for example, the hardware arrangement 400 is used in the device 100, the codes in the computer program of the arrangement 400 comprise: a module 410A for acquiring an identification result of an operator. The codes in the computer program further comprise a module 410B for acquiring an acoustic feature set corresponding to the operator based on the identification result of the operator. The codes in the computer program further comprise a module 410C for recognizing voice of the operator from received sound based on the acquired acoustic feature set.

The computer program module may substantially perform various actions in the flows illustrated in FIGS. 1-3 to simulate the voice recognition apparatus 112. In other words, when different computer program modules are executed in the processor 406, they may correspond to any one or more of the different units 210-290 described above in the voice recognition apparatus 112.

Although code means in the embodiment disclosed above in conjunction with FIG. 4 is implemented as computer program modules, which when executed in the processor 406, cause the hardware arrangement 400 to perform the actions described above in conjunction with FIG. 3, in an alternative embodiment, at least one of the code means may be implemented at least partially as a hardware circuit.

The processor may be a single Central Processing Unit (CPU), or may also comprise two or more processing units. For example, the processor may comprise a general purpose microprocessor, an instruction set processor, and/or a related chipset and/or a special purpose microprocessor (for example, an Application-Specific Integrated Circuit (ASIC).) The processor may further comprise an onboard memory for caching purposes. The computer program may be carried by a computer program product connected to the processor. The computer program product may comprise a computer readable medium having a computer program stored thereon. For example, the computer program product may be a flash memory, a Random Access Memory (RAM), a ROM, an EEPROM etc., and in an alternative embodiment, the computer program modules described above may be distributed among different computer program products in a form of memory within the UE.

The purposes, technical solutions and beneficial effects of the present disclosure have been described in further detail in the specific embodiments described above. It should be understood that the above description is only the specific embodiments of the present disclosure, and is not intended to limit the present disclosure, and any modifications, equivalent substitutions, improvements, etc. which are made within the spirit and principles of the present disclosure should be included in the protection scope of the present disclosure.

I claim:

1. A voice recognition method performed by a vehicle based on identity recognition, the method comprising:
   judging an environmental state;
   activating an identity recognition function in response to the environmental state meeting a predetermined condition;
   receiving a result of recognizing an identity;
   determining an acoustic feature set corresponding to the recognized identity based on the result, wherein the acoustic feature set comprises acoustic features corresponding to phonemes, the acoustic feature set corresponding to the recognized identity is generated based on a voice instruction from an operator having the recognized identity in a driving scene of the vehicle, the acoustic features comprise at least one of a linear prediction coefficient, a cepstral coefficient, an Mel frequency cepstral coefficient, or a perceptual linear prediction coefficient;

recognizing a voice corresponding to the recognized identity from received sound based on the determined acoustic feature set; and recognizing an operation to be performed by the vehicle from the voice corresponding to the recognized identity, wherein the step of recognizing voice corresponding to the recognized identity from received sound further comprises: extracting acoustic features from the received sound; matching the extracted acoustic features with the acquired acoustic feature set corresponding to the recognized identity; and recognizing the received sound as the voice corresponding to the recognized identity if the extracted acoustic features match the determined acoustic feature set; and wherein the step of matching the extracted acoustic features with the determined acoustic feature set corresponding to the recognized identity comprises: calculating a maximum likelihood probability of the extracted acoustic features based on the determined acoustic feature set corresponding to the recognized identity, wherein the maximum likelihood probability is calculated, by using a Gaussian Mixture Model (GMM), through calculating a probability that an acoustic feature of each of a plurality of frames is generated by a corresponding phoneme and multiplying probabilities for the plurality of frames to obtain a conditional probability; and determining that the extracted acoustic features match the acoustic feature set corresponding to the recognized identity when the calculated probability is greater than a first threshold, wherein the first threshold is a probability threshold indicating whether the recognized identity is the identity corresponding to the extracted acoustic features.

2. The voice recognition method according to claim 1, wherein the step of judging an environmental state comprises:
receiving sensor data from at least one environmental sensor; and
determining whether the environmental state meets the predetermined condition.

3. The voice recognition method according to claim 2, wherein determining whether the environmental state meets the predetermined condition according to the sensor data comprises:
determining whether the sensor data reaches a predetermined threshold; and
determining that the environmental state meets the predetermined condition in response to determining that the sensor data reaches the predetermined threshold.

4. The voice recognition method according to claim 2, wherein the at least one environmental sensor comprises at least one of a vehicle door sensor, a driving position sensor, or a driving state sensor.

5. The voice recognition method according to claim 1, wherein the step of receiving a result of recognizing an identity comprises:
receiving the result from an external identification apparatus,
wherein the external identification apparatus recognizes the identity with at least one of the following techniques: face recognition, iris recognition, fingerprint recognition, password recognition, and login information recognition.

6. The voice recognition method according to claim 1, further comprising:
creating an identity and establishing a corresponding acoustic feature set for the identity.

7. The voice recognition method according to claim 6, wherein the step of establishing a corresponding acoustic feature set for the identity comprises:
receiving voice corresponding to the identity;
extracting acoustic features corresponding to the identity from the received voice; and
establishing an acoustic feature set corresponding to the identity according to the extracted acoustic features.

8. The voice recognition method according to claim 6, wherein the step of establishing a corresponding acoustic feature set for the identity comprises:
receiving voice corresponding to the identity;
transmitting the received voice to a server; and
receiving an acoustic feature set corresponding to the identity from the server.

9. The voice recognition method according to claim 6, further comprising:
storing data required for processing voice corresponding to the created identity in a database in association with the created identity.

10. The voice recognition method according to claim 1, further comprising:
updating the acoustic feature set corresponding to the recognized identity with the extracted acoustic features when the calculated probability is greater than the first threshold and less than a second threshold.

11. A voice recognition apparatus of a vehicle based on identity recognition, the voice recognition apparatus comprising:
a processor;
a memory having instructions stored thereon, which when executed by the processor, cause the processor to:
judge an environmental state;
activate an identity recognition function in response to the environmental state meeting a predetermined condition;
receive a result of recognizing an identity;
determine an acoustic feature set corresponding to the recognized identity based on the result, wherein the acoustic feature set comprises acoustic features corresponding to phonemes, the acoustic feature set corresponding to the recognized identity is generated based on a voice instruction from an operator having the recognized identity in a driving scene of the vehicle, the acoustic features comprise at least one of a linear prediction coefficient, a cepstral coefficient, an Mel frequency cepstral coefficient, or a perceptual linear prediction coefficient;
recognize a voice corresponding to the recognized identity from received sound based on the acquired acoustic feature set; and
recognize an operation to be performed by the vehicle from the voice corresponding to the recognized identity,
wherein the instructions, which when executed by the processor, further cause the processor to: extract acoustic features from the received sound; match the extracted acoustic features with the determined acoustic feature set corresponding to the recognized identity; and recognize the received sound as the voice corresponding to the recognized identity if the extracted acoustic features match the determined acoustic feature set; and wherein the instructions, which when executed by the processor, further cause the processor to: calculate a maximum likelihood probability of the extracted acoustic features based on the determined acoustic feature set corresponding to the recognized identity, wherein the maximum likelihood probability is calculated, by using a Gaussian Mixture Model (GMM), through calculating a probability that an acoustic feature of each of a plurality of frames is generated by a corresponding phoneme and multiplying probabilities for the plurality of frames to obtain a conditional probability; and determine that the extracted acoustic features match the acoustic feature set corresponding to the recognized identity when the calculated probability is greater than a first threshold.

12. The voice recognition apparatus according to claim 11, wherein the instructions, which when executed by the processor, further cause the processor to:

receive sensor data from at least one environmental sensor; and determine whether the environmental state meets the predetermined condition according to the sensor data.

13. The voice recognition apparatus according to claim 11, wherein the instructions, which when executed by the processor, further cause the processor to:

receive the result from an external identification apparatus, wherein the external identification apparatus recognizes the identity with at least one of the following technologies: face recognition, iris recognition, fingerprint recognition, password recognition, and login information recognition.

14. The voice recognition apparatus according to claim 11, wherein the instructions, which when executed by the processor, further cause the processor to:

create an identity and establish a corresponding acoustic feature set for the identity.

15. The voice recognition apparatus according to claim 14, wherein the instructions, which when executed by the processor, further cause the processor to:

receive voice corresponding to the identity;

extract acoustic features corresponding to the identity from the received voice; and establish an acoustic feature set corresponding to the identity according to the extracted acoustic features.

16. The voice recognition apparatus according to claim 14, wherein the instructions, which when executed by the processor, further cause the processor to:

receive voice corresponding to the identity;

transmit the received voice to a server; and receive an acoustic feature set corresponding to the identity from the server.

17. The voice recognition apparatus according to claim 11, further comprising at least one of:

a sound input apparatus configured to receive sound from outside and convert the sound into an electrical signal;

an identification apparatus configured to identify the identity; and at least one environmental sensor configured to detect environmental data.

* * * * *